United States Patent
Tappen

(10) Patent No.: US 6,715,458 B1
(45) Date of Patent: Apr. 6, 2004

(54) ENGINE BLOCK CRANKSHAFT BEARINGS

(75) Inventor: Grant K. Tappen, Washington, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/709,819

(22) Filed: Aug. 3, 2000

(51) Int. Cl.[7] .................................................. F02F 7/00
(52) U.S. Cl. .................................................. 123/195 R
(58) Field of Search ...................... 123/193.4, 195 C, 123/195 R

(56) References Cited

U.S. PATENT DOCUMENTS

| | | | |
|---|---|---|---|
| 4,369,744 A | * | 1/1983 | Kubozuka et al. ...... 123/195 C |
| 5,203,854 A | | 4/1993 | Nilsson et al. ............... 384/433 |
| 5,253,625 A | * | 10/1993 | Donahue et al. ......... 123/193.4 |
| 5,901,679 A | * | 5/1999 | Tanaka et al. .......... 123/195 C |

* cited by examiner

*Primary Examiner*—Noah P. Kamen
(74) *Attorney, Agent, or Firm*—Leslie C. Hodges

(57) ABSTRACT

An internal combustion engine comprises an aluminum alloy engine block housing pistons in cylinders and having a lower face including an upper semi-circular bearing surface. A lower bearing support has a lower semi-circular bearing surface to complement the upper semi-circular bearing surface in the engine block to define a crankshaft bore to rotatably support an iron alloy crankshaft. The lower bearing support is formed of a single aluminum-silicon alloy having a coefficient of thermal expansion comparable to the iron alloy crankshaft to promote a consistent clearance between the lower bearing support and the crankshaft. Such an aluminum-silicon alloy is comprised of approximately 33–35% by weight silicon and the balance is aluminum.

10 Claims, 3 Drawing Sheets

ENGINE BLOCK CRANKSHAFT BEARINGS

TECHNICAL FIELD

The present invention relates to bearing supports for a main bearing in an internal combustion engine.

BACKGROUND OF THE INVENTION

Mass reduction is a major goal in engine design. Therefore it is known to substitute aluminum for iron in certain engine components. The drawback in some applications is that commonly employed aluminum alloys, such as 380 aluminum, have a much higher coefficient of thermal expansion (CTE) than iron. For example, cast iron has a CTE of about $12 \times 10^{-6}$/K, whereas 380 aluminum has a CTE of about $21 \times 10^{-6}$/K, a factor of almost two. Therefore in the case where aluminum bearing caps support an iron crankshaft, the aluminum bearing caps thermally grow at a faster rate than the crankshaft, resulting in an increased bearing clearance and potentially unacceptable noise generation. Greater bore clearances require larger capacity lubrication systems to compensate for oil leakage past the main bearings and to maintain adequate oil film thickness on the bearings.

One solution to the thermal expansion issue, as described in U.S. Pat. No. 5,203,854, is to produce an aluminum bearing cap cast with an iron core adjacent to the crankshaft bore to provide comparable coefficients of thermal expansion between the crankshaft and the bearing cap. It is proposed that the bearing clearance does not significantly vary and therefore noise generation is reduced.

One obstacle with casting an iron core in an aluminum bearing is to ensure a high strength connection between the iron core and the aluminum casting. U.S. Pat. No. 5,203,854 addresses the concern of boring dissimilar materials, in particular a semi-circular iron surface in the bearing cap and a complementary semi-circular surface in an aluminum engine block. Due to the different hardnesses, tool selection and settings may be compromised, which could potentially affect the quality of the crankshaft bore. To facilitate machinability, an aluminum layer of a few millimeters in thickness is added to the bore surface so that the boring tool cuts the same material throughout the revolution.

The purpose of the present invention is to provide a main bearing support which has a CTE comparable to the crankshaft it supports, has machining characteristics similar to the complementary boring surface, and is comprised of a single alloy for efficient recyclability.

SUMMARY OF THE INVENTION

The present invention is for an internal combustion engine having an aluminum engine block, an iron crankshaft, and main bearing supports comprised entirely of an aluminum-silicon alloy. The aluminum-silicon alloy has the following material characteristics: low CTE comparable to iron alloy; high strength comparable to iron alloy; and good machinability similar to other aluminum alloys such as 380 aluminum. The hypereutetic aluminum-silicon alloy that satisfies these characteristics is composed of at least 25% silicon by weight with the remaining being aluminum.

More specifically, aluminum-silicon alloy with 33–35% silicon has a CTE of approximately $13.2 \times 10^{-6}$/K, which is comparable to iron alloy. Previously such a low CTE was not achievable with aluminum alloys. This material selection ensures that a tighter crankshaft bore tolerance may be maintained through consistent thermal rates of expansion of the iron crankshaft and aluminum-silicon bearing supports. A tighter crankshaft bore tolerance will increase bearing life as there is less wear of the bearings.

The use of an aluminum-silicon bearing support in conjunction with an aluminum engine block provides ease of machining the crankshaft bore; it eliminates mixed material machining previously required between iron bearing supports and an aluminum engine block. Aluminum machines much faster and easier than iron thereby reducing machining cycle time and tool wear.

Therefore main bearing supports composed of such a hypereutetic aluminum-silicon alloy provide a combination of low mass, ease of machining, and dimensional stability of the crankshaft bore, all with a single alloy.

DESCRIPTION OF THE PREFERRED EMBODIMENT

Figure 1:
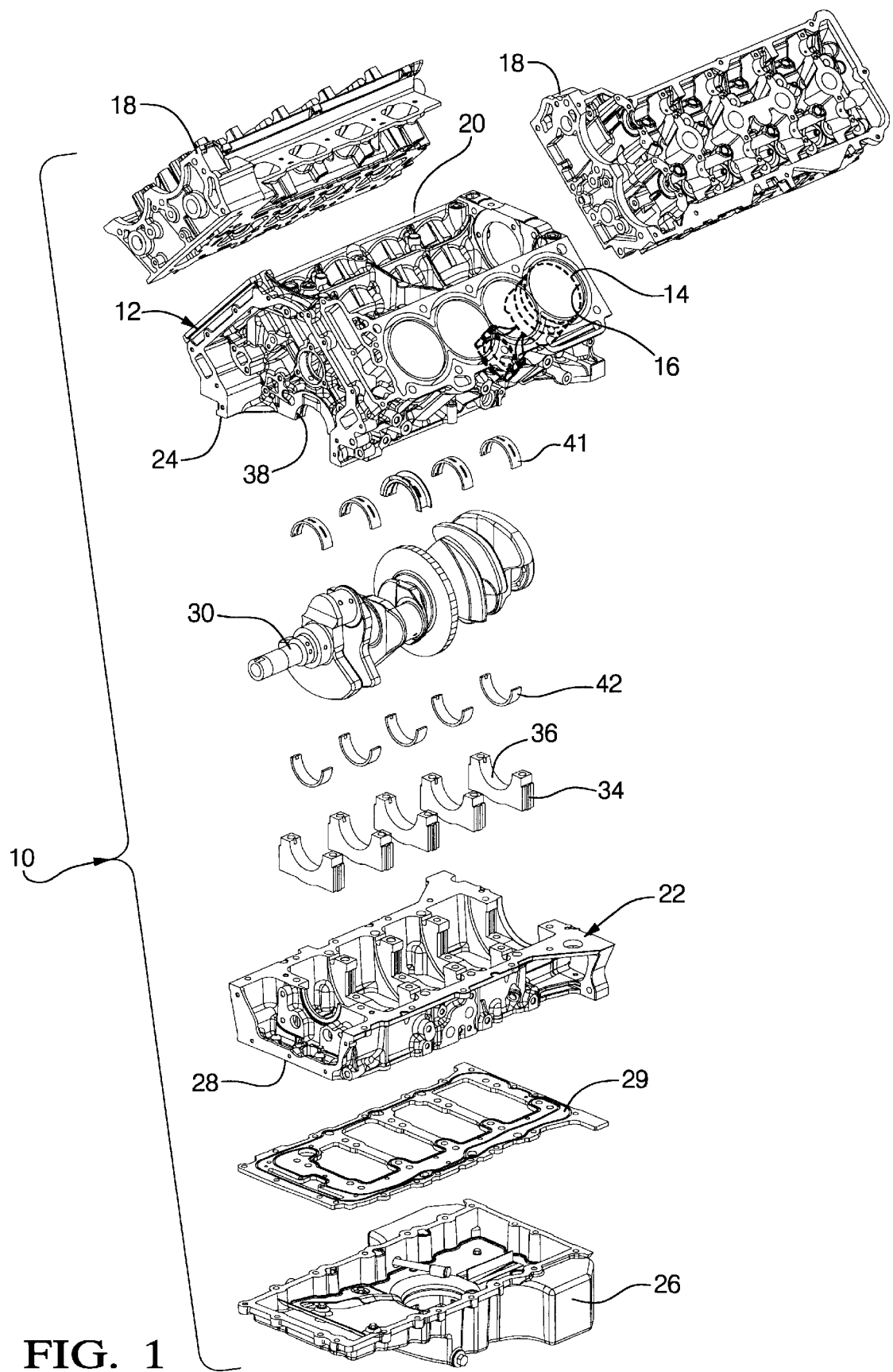
FIG. 1 is an expanded perspective view of an internal combustion engine.

FIG. 1 illustrates an expanded view of an internal combustion engine, shown generally as 10, comprising an engine block 12, housing pistons 14 in cylinders 16. Cylinder heads 18 mate with the upper face 20 of the engine block 12 to close off the cylinders 16. A crankcase 22 bolts to the lower face 24 of the engine block 12, and an oil pan 26 mounts to the lower face 28 of the crankcase 22. An oil manifold 29 is disposed between the crankcase 22 and the oil pan 26.

Figure 2:
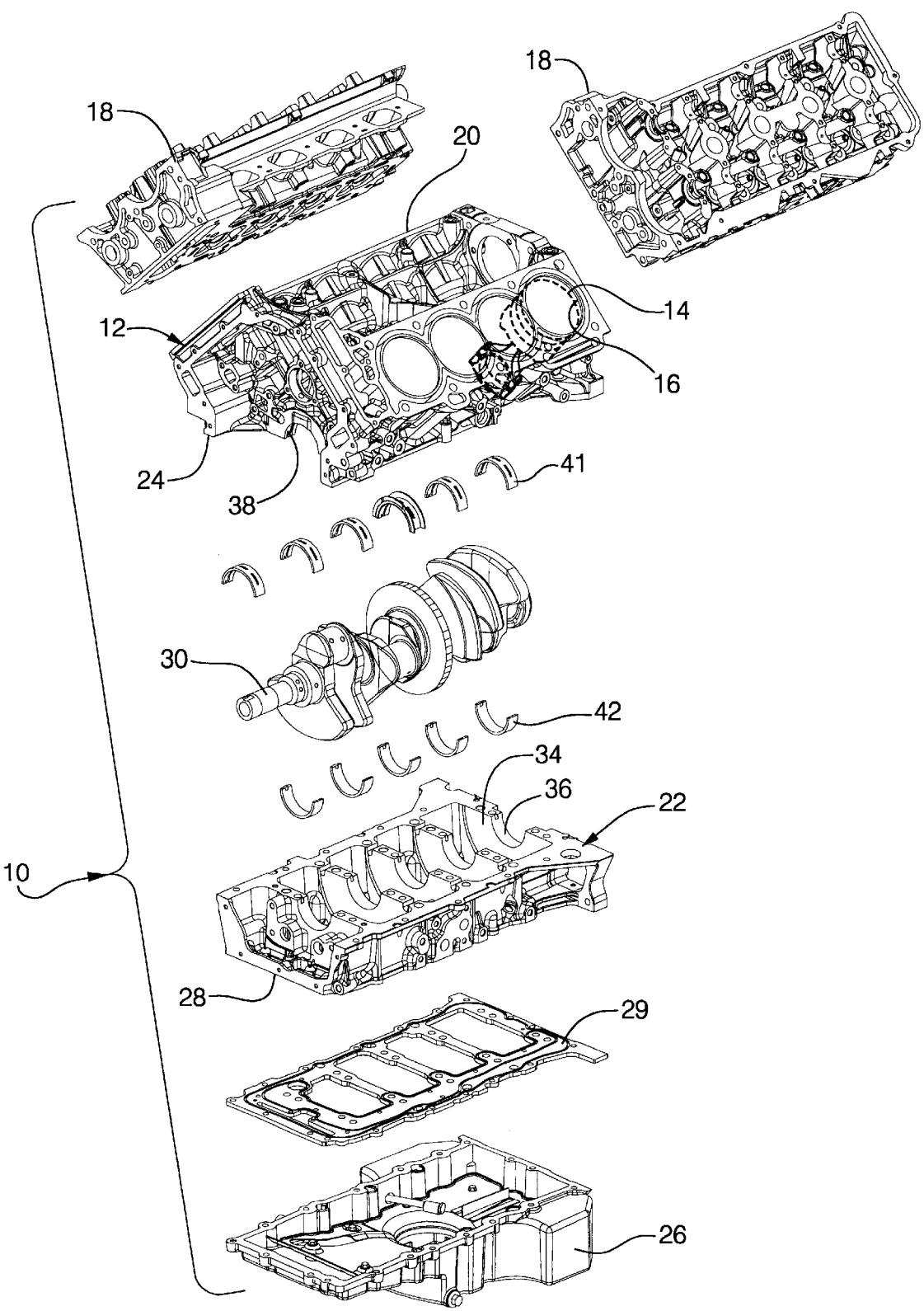
FIG. 2 is an expanded perspective view of an internal combustion engine having bearings of a second configuration.

A crankshaft 30 is housed between the lower face 24 of the engine block 12 and the crankcase 22 and is rotatably supported by bearing supports. A lower bearing support 34 may be provided in the form of a separate, lower insert, which is receivable by the crankcase 22, as shown in FIG. 1, or which may be bolted to the lower face of the engine block, otherwise known as a bearing cap. Alternatively, the lower bearing support 34 may be cast integral with the crankcase 22 as shown in FIG. 2.

The lower bearing support 34 includes a lower semi-circular bearing surface 36. The lower face 24 of the engine block 12 includes an upper semi-circular bearing surface 38 to complement the lower semi-circular bearing surface 36 in the lower bearing support 34. Together, the semi-circular bearing surfaces 36,38 define a crankshaft bore 40 in which upper and lower bushing-type bearings 41 and 42, respectively, support the crankshaft 30.

With regard to material selection, the engine block 12 is die cast of a common aluminum alloy such as 380 aluminum for mass efficiency, whereas the crankshaft 30 is comprised of an iron alloy for strength. The 380 aluminum is primarily aluminum with the following elements: 7.5–9.5% silicon, 3.0–4.0% copper, 3.0% zinc, maximum of 1.3% iron, 0.35% tin, 0.5% manganese, 0.5% nickel, 0.1% magnesium, and 0.5% other.

For mass efficiency, the lower bearing support 34 could also be 380 aluminum, but for the significant difference in coefficients of thermal expansion between 380 aluminum at approximately $21 \times 10^{-6}$/K and the crankshaft iron alloy at approximately $12 \times 10^{-6}$/K. This difference may lead to bearing clearances outside of tolerance as the crankshaft and bearing supports thermally expand at different rates. Excess bearing clearance from the bearing support growing away from the crankshaft may cause the oil film to degenerate allowing metal-to-metal contact and reducing bearing life.

Therefore the present invention provides lower bearing supports 34 comprised only of a hypereutetic aluminum-silicon alloy which has a CTE of approximately $13.2 \times 10^{-6}/K$, comparable to the iron alloy crankshaft 30. Use of this alloy reduces the likelihood of the crankshaft bearing clearance growing beyond the dimensional specification, which in turn reduces the effect of excessive noise generation and oil consumption. A nearly constant bearing clearance may be maintained throughout temperatures ranging from about −40° C. to 175° C. To achieve the low CTE, the aluminum-silicon alloy is composed of at least 25% by weight silicon, and preferably approximately 33–35% by weight silicon, with aluminum comprising the balance. Such an aluminum-silicon alloy is available from PEAK Werkstoff GmbH and is designated as Dispal S220. Prior to commercial availability of this alloy, the maximum silicon concentration an aluminum alloy could maintain was about 18% in 390 aluminum, before the silicon would separate from the balance of the alloy.

The aluminum-silicon alloy has improved machinability characteristics over iron alloys. When the crankshaft bore must be cut into an aluminum block and iron caps, the iron constrains the machining capabilities; for example, machining cycle time is less and tool life is shortened. In the present invention, boring the crankshaft bore into the bearing support and engine block does not create tool selection or tool setting issues. The boring tool cuts through approximately the same hardness material throughout the revolution, helping to ensure a round and straight bore.

The aluminum-silicon alloy contains silicon particles sized on the order of 10 to 20 microns. This may be contrasted with 390 aluminum with silicon particles from 70 to 100 microns. Smaller silicon particles are not as abrasive to a boring tool and therefore the tool does not wear as quickly.

As shown in FIG. 2, the lower bearing support 34 is integrated as part of the crankcase 22, by casting the lower bearing support in as the crankcase is cast. Molten aluminum flows around the aluminum-silicon bearing support partially melting the outer surface. The bearing support resolidifies as the crankcase solidifies, creating a metallurgical bond between the bearing support and the crankcase. Such a metallurgical bond can not be achieved between an iron bearing support and aluminum crankcase; instead a mechanical bond must be relied on.

Figure 3:
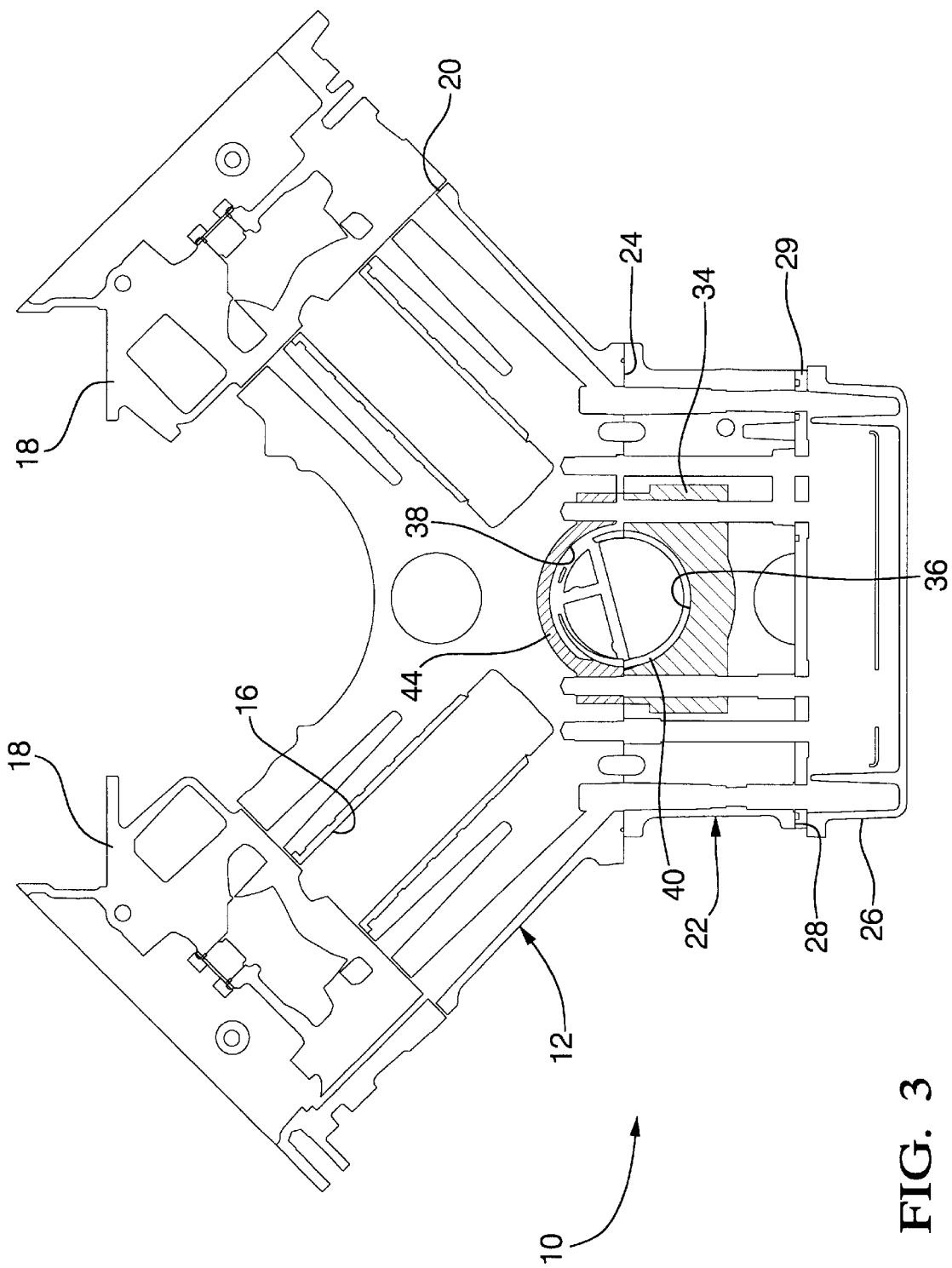
FIG. 3 is a sectional end view of an internal combustion engine including bearing supports of the present invention.

Instead of boring the upper bearing surface of the crankshaft bore directly in the engine block 12, an upper bearing support 44 may be used as shown in FIG. 3. Similar to the lower bearing supports 34 discussed above, the upper bearing support 44 may be a separate bearing insert which nests in the engine block 12 or may be cast integral in the block. Where an upper bearing support 44 is used, it is preferable to form it from the same hypereutetic aluminum-silicon alloy as is used for the lower bearing support 34. This will further provide dimensional stability of the crankshaft bore 40

The foregoing description of the preferred embodiment of the invention has been presented for the purpose of illustration and description. It is not intended to be exhaustive, nor is it intended to limit the invention to the precise form disclosed. It will be apparent to those skilled in the art that the disclosed embodiment may be modified in light of the above teachings. The embodiment was chosen to provide an illustration of the principles of the invention and its practical application to thereby enable one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. An internal combustion engine, comprising: an aluminum alloy engine block housing pistons in cylinders and having a lower face including an upper semi-circular bearing surface; an iron alloy crankshaft; and a lower bearing support having a lower semi-circular bearing surface to complement said upper semi-circular bearing surface in said engine block to define a crankshaft bore to rotatably support said iron alloy crankshaft and wherein said engine block is formed of an aluminum alloy having a coefficient of thermal expansion of approximately $21 \times 10^{-6}/K$ and said lower bearing support is formed of a single hypereutectic aluminum-silicon alloy having a coefficient of thermal expansion comparable to said iron alloy crankshaft to promote a consistent clearance between said lower bearing support and said crankshaft.

2. An internal combustion engine, as defined in claim 1, wherein said aluminum-silicon alloy is comprised of at least 25% by weight silicon.

3. An internal combustion engine, as defined in claim 2, wherein said aluminum-silicon alloy is comprised of approximately 33–35% by weight silicon and the balance is aluminum.

4. An internal combustion engine, as defined in claim 3, further comprising a crankcase mounted to said lower face of said engine block and wherein said lower bearing support is cast integral with said crankcase.

5. An internal combustion engine, as defined in claim 1, wherein said aluminum-silicon alloy contains silicon particles sized on the order of 10 to 20 microns.

6. An internal combustion engine, comprising: an aluminum alloy engine block housing pistons in cylinders and having a lower face including an upper bearing support having an upper semi-circular bearing surface; an iron alloy crankshaft; and a lower bearing support having a lower semi-circular bearing surface to complement said upper semi-circular bearing surface in said upper bearing support to define a crankshaft bore for rotatably supporting said iron alloy crankshaft and wherein said engine block is formed of a common aluminum alloy and said upper and lower bearing supports are formed of a single hypereutectic aluminum-silicon alloy having a coefficient of thermal expansion comparable to said iron alloy crankshaft to promote a consistent clearance between said upper and lower bearing supports and said crankshaft.

7. An internal combustion engine, as defined in claim 6, wherein said aluminum-silicon alloy is comprised of at least 25% by weight silicon.

8. An internal combustion engine, as defined in claim 7, further comprising a crankcase mounted to said lower face of said engine block and wherein said lower bearing support is cast integral with said crankcase.

9. An internal combustion engine, as defined in claim 8, wherein said upper bearing support is cast integral with said engine block.

10. An internal combustion engine, as defined in claim 6, wherein said aluminum-silicon alloy contains silicon particles sized on the order of 10 to 20 microns.

\* \* \* \* \*